US006168841B1

(12) United States Patent
Chen

(10) Patent No.: US 6,168,841 B1
(45) Date of Patent: Jan. 2, 2001

(54) LABEL ADAPTED FOR USE ON OPTICAL DISKS

(76) Inventor: Yao-Kuo Chen, P.O. Box 82-144, Taipei (TW)

(*) Notice: Under 35 U.S.C. 154(b), the term of this patent shall be extended for 0 days.

(21) Appl. No.: 09/086,991

(22) Filed: May 29, 1998

(51) Int. Cl.[7] .......... B32B 3/02

(52) U.S. Cl. .......... 428/40.1; 283/81; 428/42.1; 428/42.2; 428/42.3; 428/43; 428/64.1; 428/66.5; 428/192

(58) Field of Search .......... 428/40.1, 42.1, 428/42.2, 42.3, 43, 192, 64.1, 66.5; 283/81

(56) References Cited

U.S. PATENT DOCUMENTS 3,925,585 * 12/1975 Aoyagi .......... 428/42.3
4,983,437 * 1/1991 Merrick .......... 428/66.6
4,983,438 * 1/1991 Jameson .......... 428/42.3

* cited by examiner

*Primary Examiner*—Nasser Ahmad
(74) *Attorney, Agent, or Firm*—A & J

(57) ABSTRACT

A label adapted for use on optical disks including an adhesive portion and an edge strip portion formed near the edges of the label and a release paper. After tearing off the edge strips of the release paper, the label can be adhered to a sheet of paper using the adhesive portion so that patterns or words can be printed on a labeling portion of the label. The labeling portion is provided with an annular portion and a central portion at the center thereof. AFter printing, a through hole of the central portion can be aligned with the central hole of the optical disk so that the label can be directly and conveniently adhered to the center of the optical disk without using any tools.

1 Claim, 9 Drawing Sheets

(PRIOR APT)

(PRIOR APT)

LABEL ADAPTED FOR USE ON OPTICAL DISKS

BACKGROUND OF THE INVENTION (a) Field of the Invention

The present invention relates generally to a label, and more particularly to a label which can be directly and conveniently adhered to optical disks without the need for any tools.

(b) Description of the Prior Art

In order to enable users of optical disks can identify the data stored in optical disks recorded thereby or to enhance the appearance of optical disks, a circular label is generally provided on the surface of the optical disk. Such labels can be printed with words or patterns using computer printers and can be torn off and adhered to the optical disks.

Reference is made to FIG. 1. A label paper is generally provided with a release paper of a specific size. The size of the release paper usually corresponds to the size of paper for use with computer printers (generally A4 size). The release paper is provided with a sticker layer b of the same size as the release paper. The label paper can be cut into several circular labels a according to the size of the optical disks, the user can feed the entire sheet of release paper with the sticker layer b into the printer so that the user can print words or patterns on the labels a on the sticker layer b. The labels a can then be removed from the release paper and adhered to the optical disks.

However, there are the following advantages with such conventional labels:

1. In order to ensure that the label can stick to the optical disk in a flat and even manner, the user generally has to use a device c (shown in FIG. 2) for adhering labels to optical disks. A disadvantage of using this device is that air bubbles will form in between the label and the surface of the optical disk. Besides, the device c is quite expensive and it may scratch the optical disk.

2. As the label paper is provided with several labels (two or three), if the user has printed only one of them and torn it off, a depression will form on the label paper. The depression may easily cause paper jam. Therefore, the user may need to print all the labels on the same label paper at one time. Besides, printing of the labels on the same paper at different times may easily dirty the remaining labels.

3. The fact that several circular labels are formed on a sheet of label paper, whether it is A4 size or not, will leave unused spaces, which is a waste of resources.

4. As the labels are formed at different positions, the user may need to adjust the paper during printing, which is very inconvenient. Besides, misprinted labels are not nice looking and may not to be discarded.

SUMMARY OF THE INVENTION

The present invention relates generally to a label, and more particularly to a label which can be directly and conveniently adhered to optical disks without the need for any tools.

A primary object of the present invention is to provide a label that can be adhered to optical disks in a flat and even manner without use of any tools or devices.

In order to achieve the above-mentioned object, the label according to the present invention comprises a release paper and a sticker layer of a corresponding size disposed on the release paper. A circular labeling portion of a size identical to or slightly smaller than that of an optical disk is formed in the sticker layer by cutting. The center of the labeling portion is cut to form a concentric annular portion of a clamped portion of the optical disk and a central portion of an cuter diameter identical to the inner diameter of the central hole of the optical disk. Both the sticker layer and the release paper are provided with tear-off lines near their edges so that the sticker layer and the release paper respectively form an adhering portion and an edge strip portion. The label of the invention has the following advantages:

1. The label of the invention can be printed one by one depending on the requirement of the use so that there is no paper jam or damage to the labels.

2. The label of the invention reduces waste of label paper, thereby reducing costs.

3. There is no need to use any tool or device to adhere the label of the invention to the optical disk, which is cost economy for the user. The label can be directly adhered to the optical disk and made flat and even thereon easily.

DETAILED DESCRIPTION OF THE PREFERRED EMBODIMENT

Figure 1:
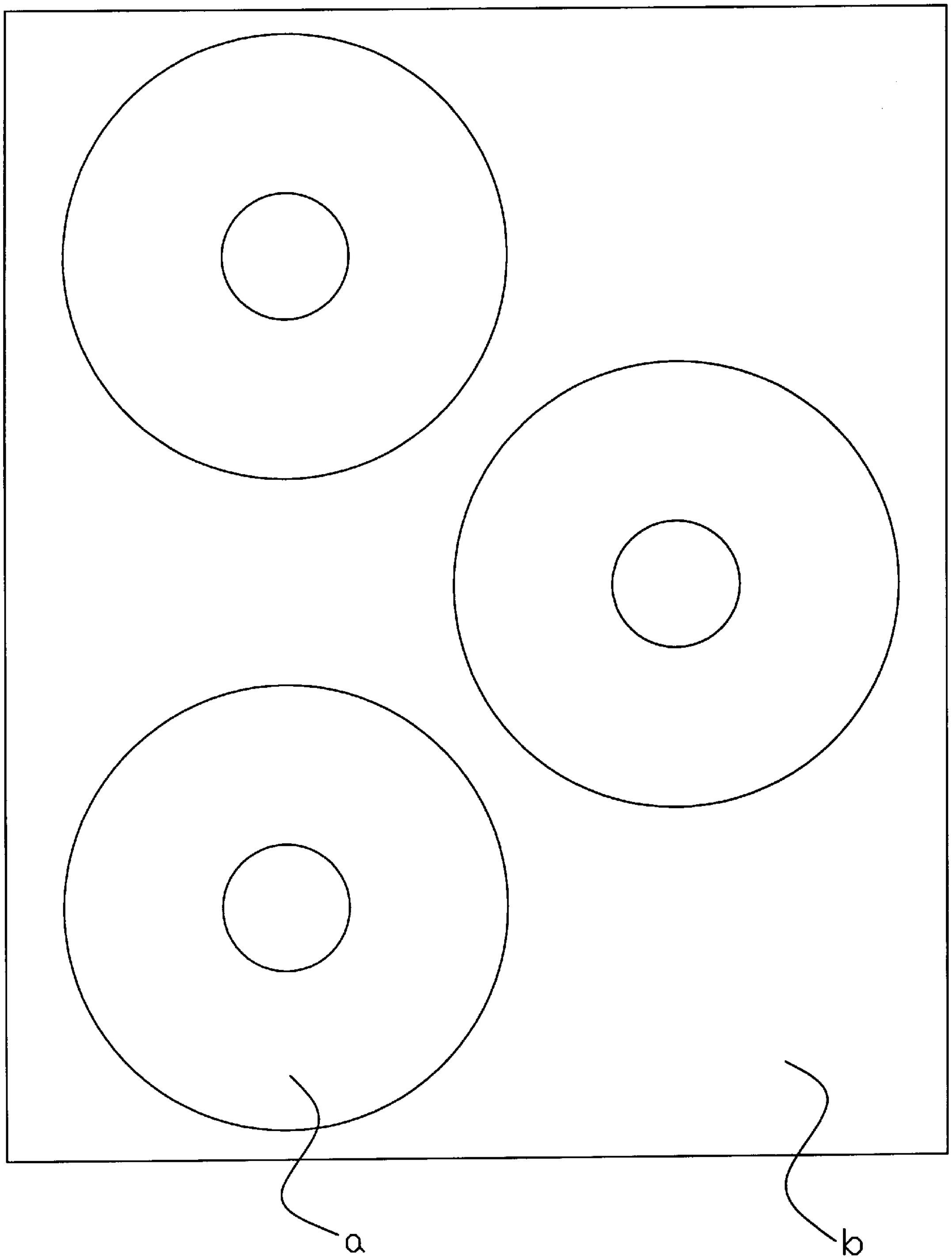
FIG. 1 is a perspective schematic view further illustrating a further step of adhering the label of the invention to the optical disk.
Figure 2:
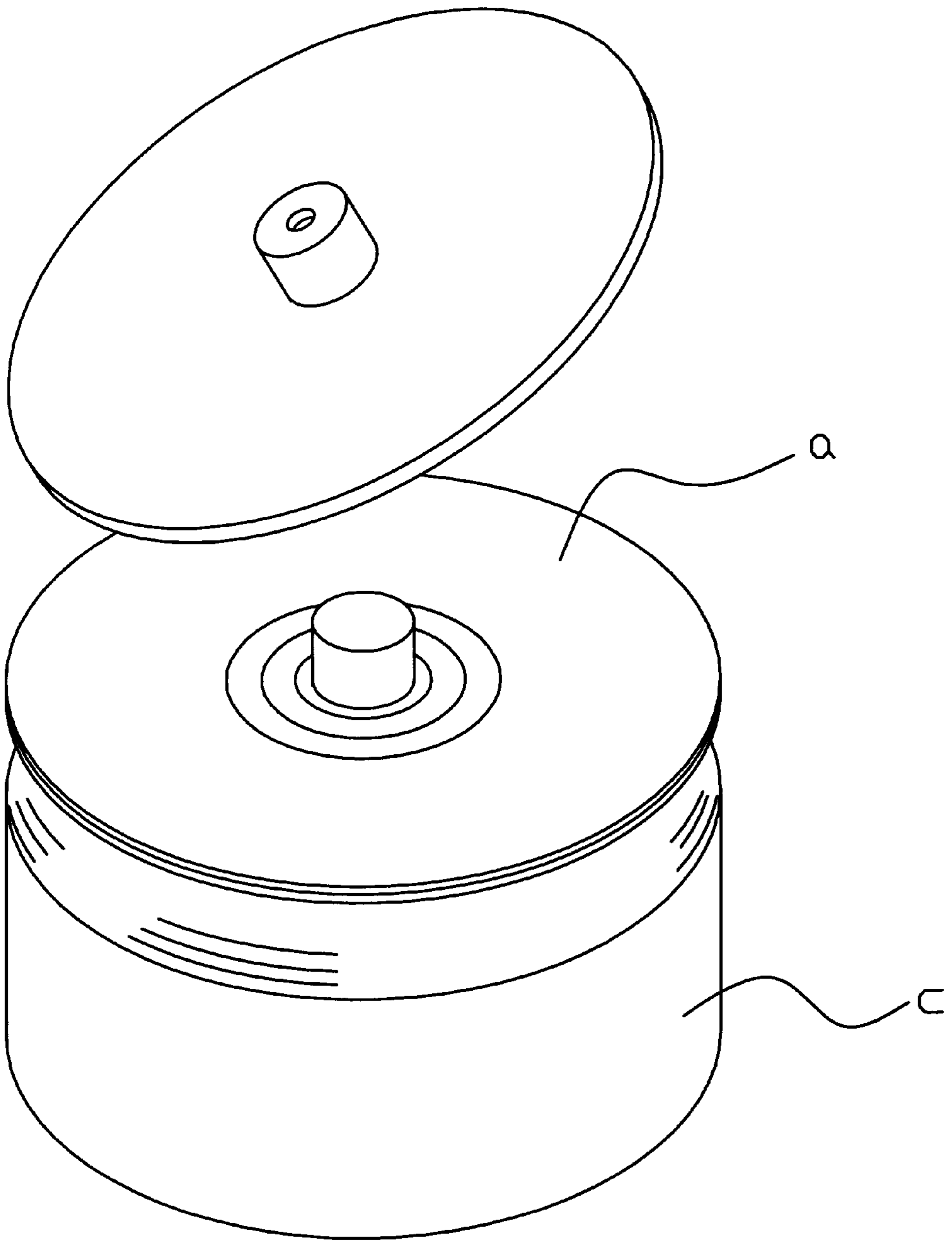
FIG. 2 is a perspective schematic view illustrating the completion of the steps of the label of the invention to the optical disk.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 3:
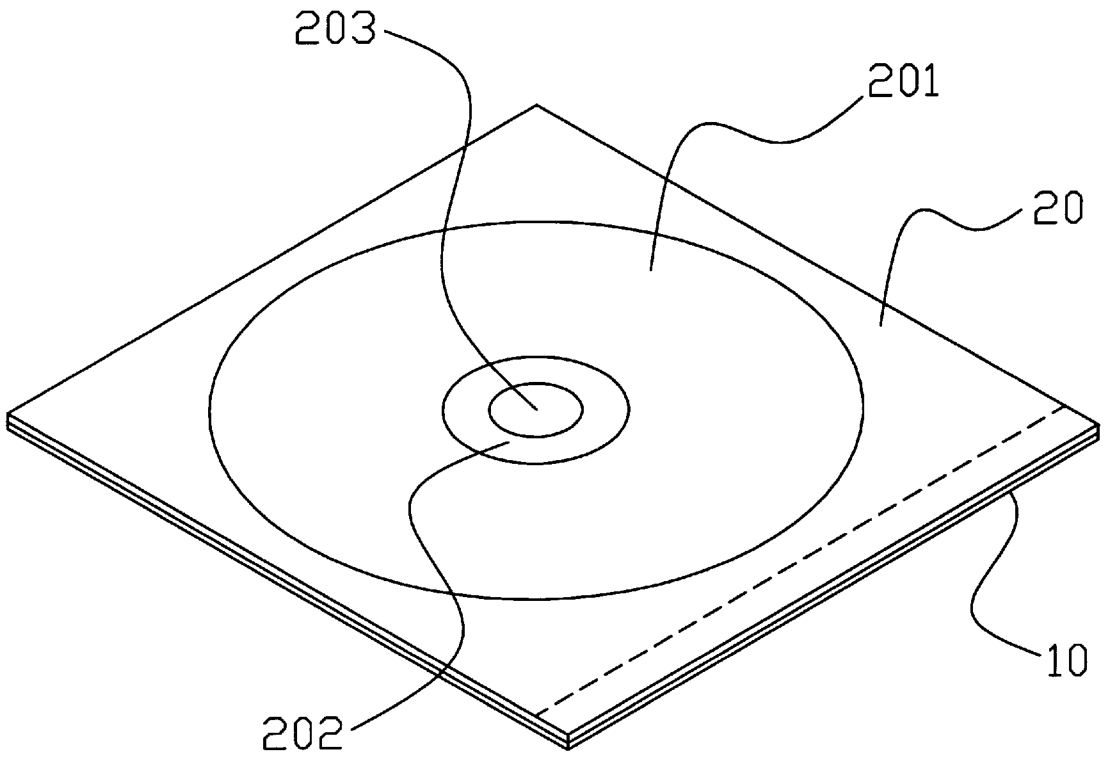
FIG. 3 is a plan schematic view of the conventional optical disk labels.
Figure 4:
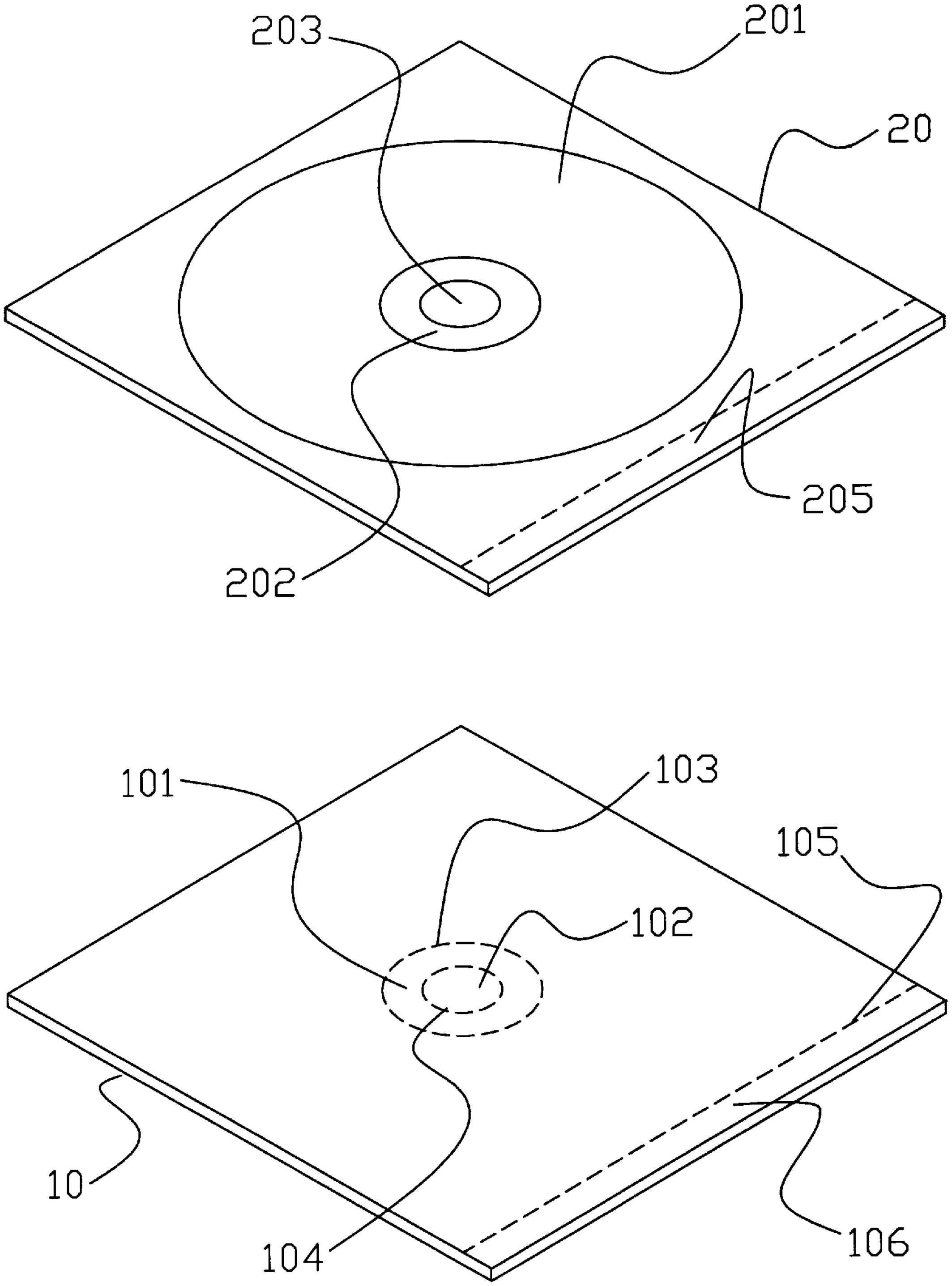
FIG. 4 is a perspective schematic view of a device used in flattening out labels on optical disks.

With reference to FIGS. 3 and 4, the present invention comprises a release paper 10, and a sticker layer 20 of the same size as the release paper 10. The sticker layer 20 has an labeling portion 201, an annular portion 202 and a central portion 203 in the form of concentric circles formed by cutting. The outer diameter of the labeling portion 201 is identical or slightly smaller than that of an optical disk. Besides, only the outer periphery of the labeling portion 201 is cut off; the release paper 10 remains intact. The outer diameter of the annular portion 202 is the same as that of an annular clamped portion near the center of the optical disk. The outer diameter of the central portion 203 is equal to the diameter of the central hole of the optical disk. The cutter cuts off the annular portion 101, 202 as well as the central portion of the release paper 10 and sticker layer 20 respectively are cut off, leaving only a plurality of connecting points 103 and 104 at the circumference. Furthermore, tear-off lines 105, 204 are simultaneously cut at the lateral edges of both the release paper 10 and the sticker layer 20, which are parallel to the lateral edges, whereby, an edge strip portion 106 is formed on the release portion 10 and an adhesive portion 205 is formed on the sticker layer 20.

Figure 5:
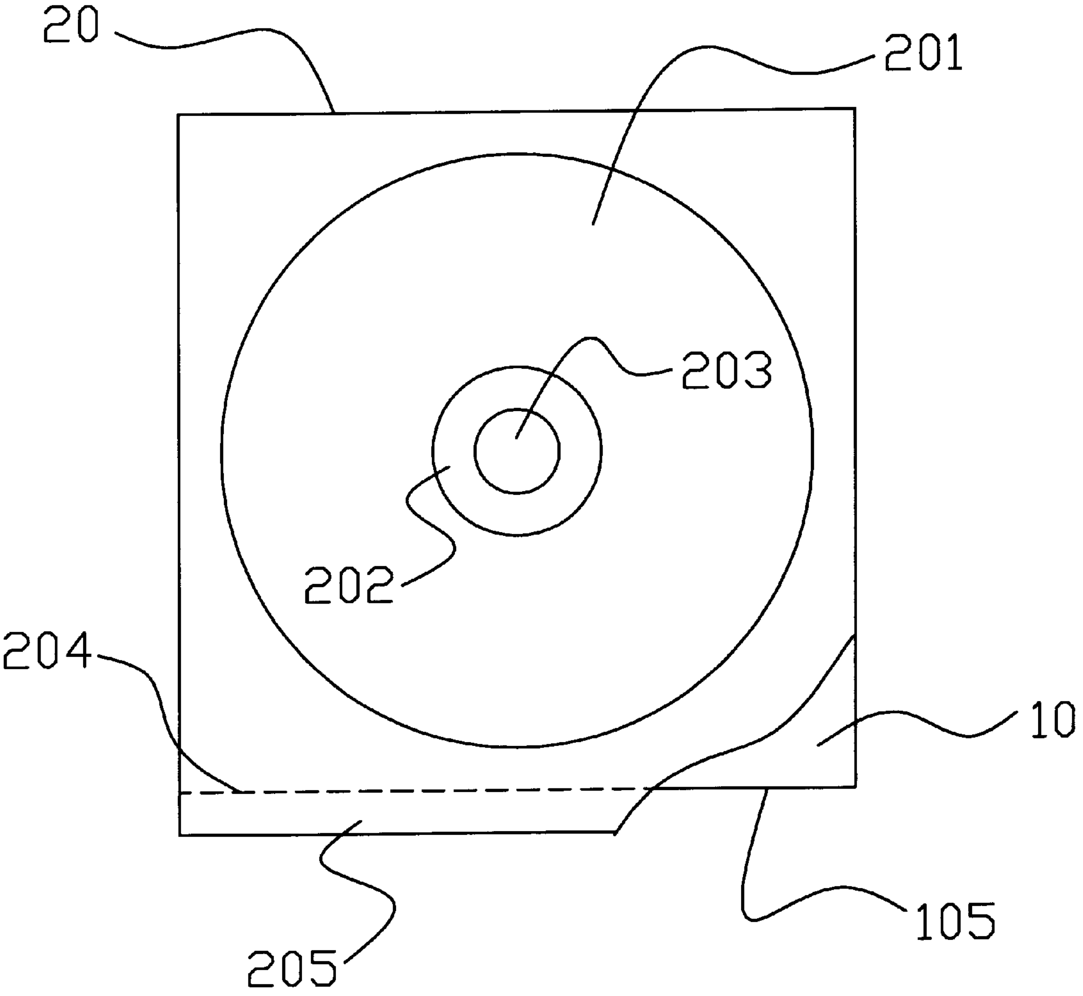
FIG. 5 is a perspective schematic view of the present invention.

Referring to FIGS. 4 and 5, when the user wants to print patterns or words on the labeling portion 201 of the label of the optical disk, he/she can firstly tear off the edge strip portion 106 along tear-off lines 105 to expose the adhesive portion 205 of the sticker layer 20. Then the label is stuck to a sheet of paper suitable for printing purposes using the adhesive portion 205. The label of the invention is adapted for use with various types of printers. After the desired patterns or words are printed on the labeling portion 201, the sticker layer 20 can be torn off along the tear-off lines 204 of the adhesive portion 205. Hence, the user can print single sheets of pattern or words one by one.

Figure 6:
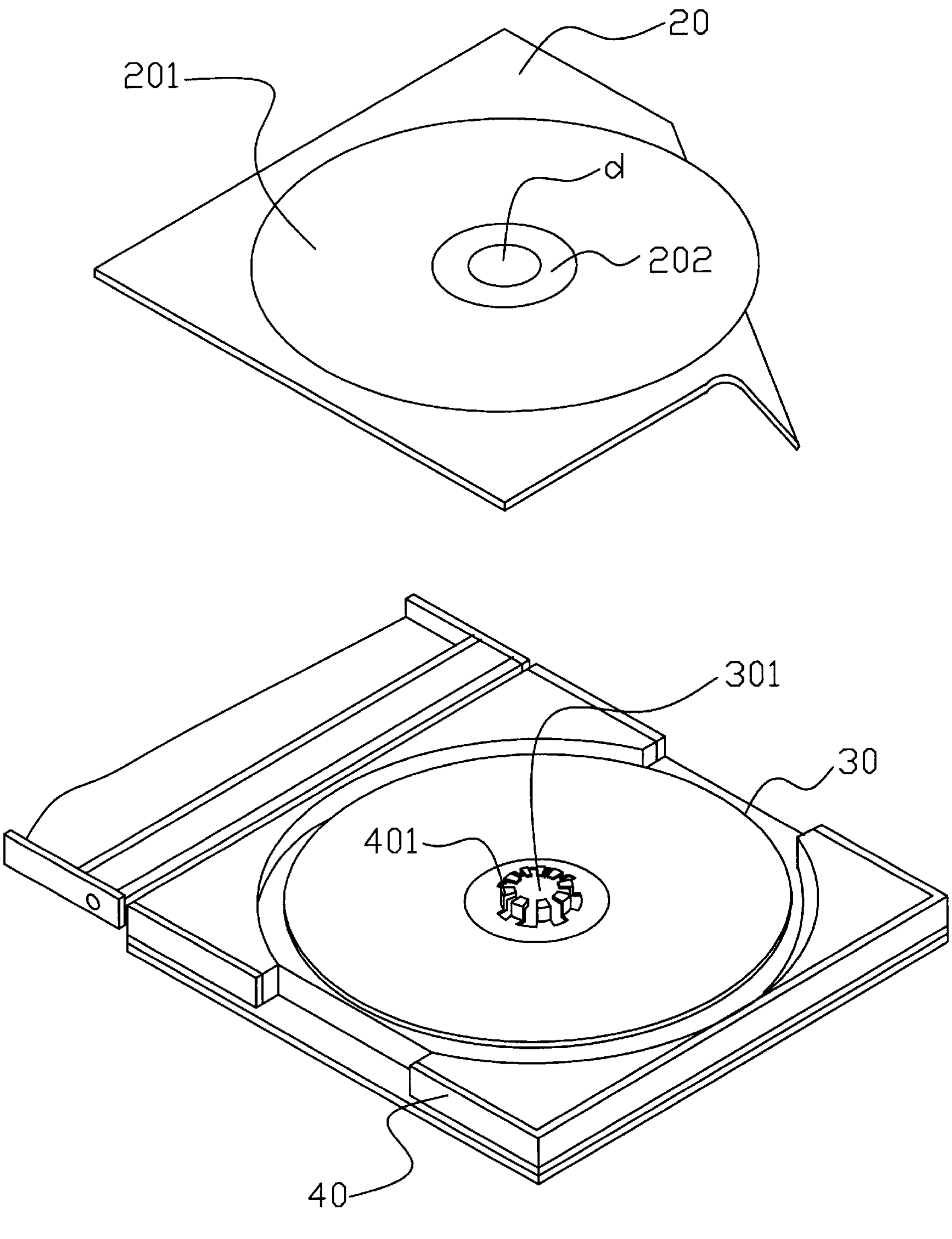
FIG. 6 is a perspective exploded view of the present invention.
Figure 7:
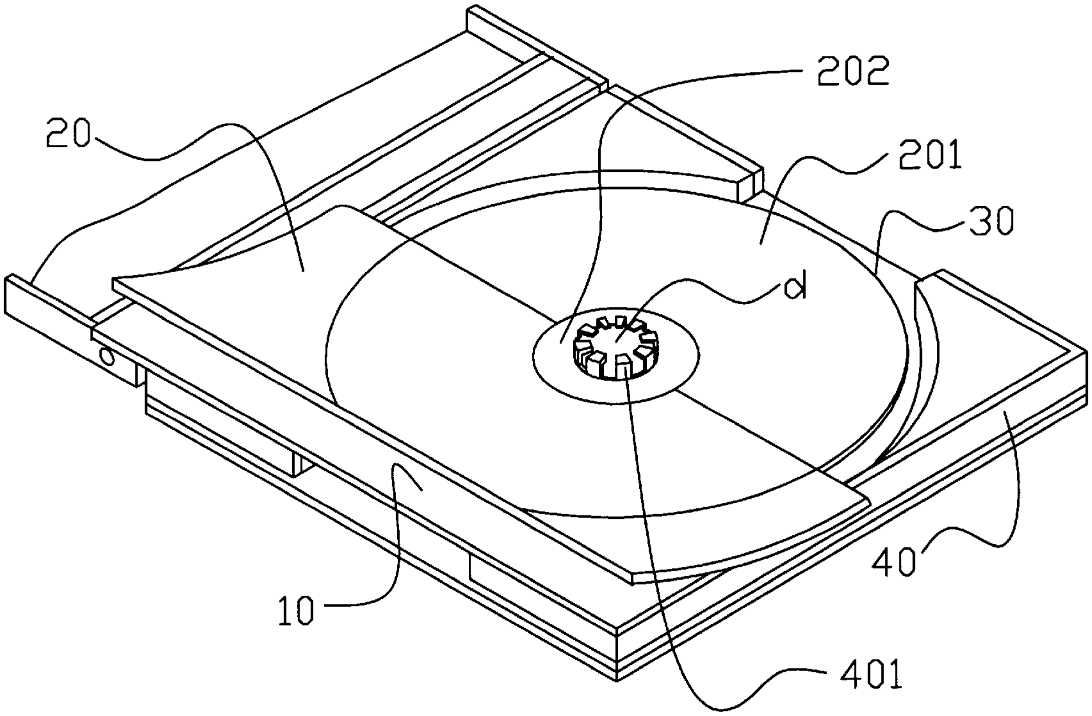
FIG. 7 is a plan schematic view illustrating printing of patterns/words on the present invention.
Figure 8:
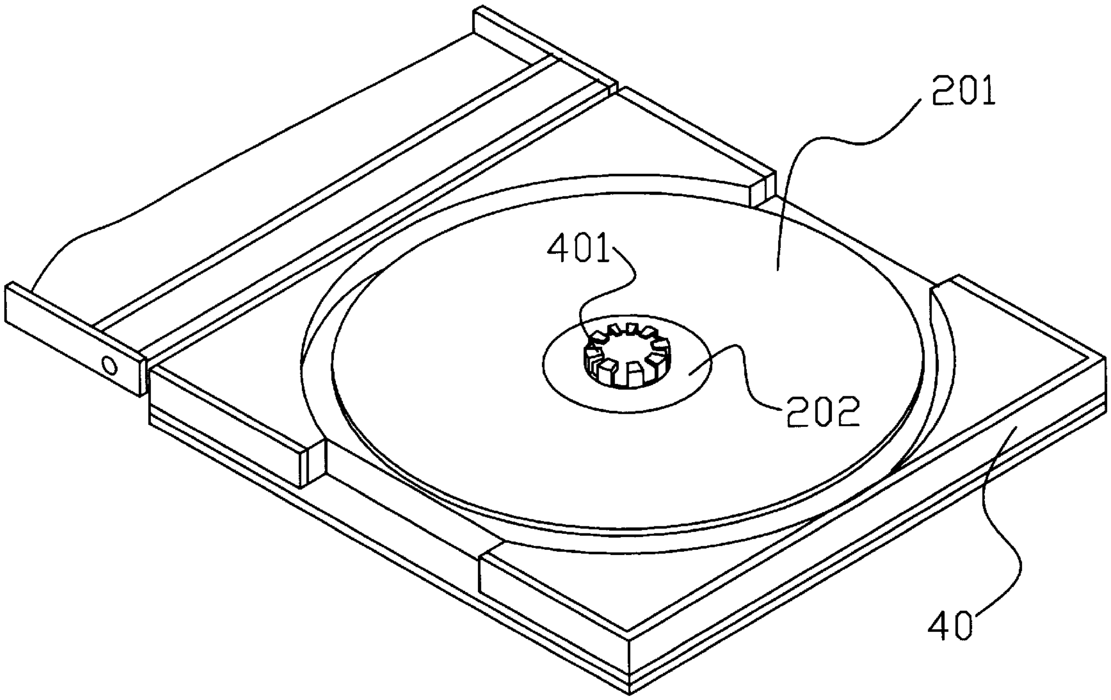
FIG. 8 is a perspective schematic view view illustrating one step of adhering the label of the invention to an optical disk.
Figure 9:
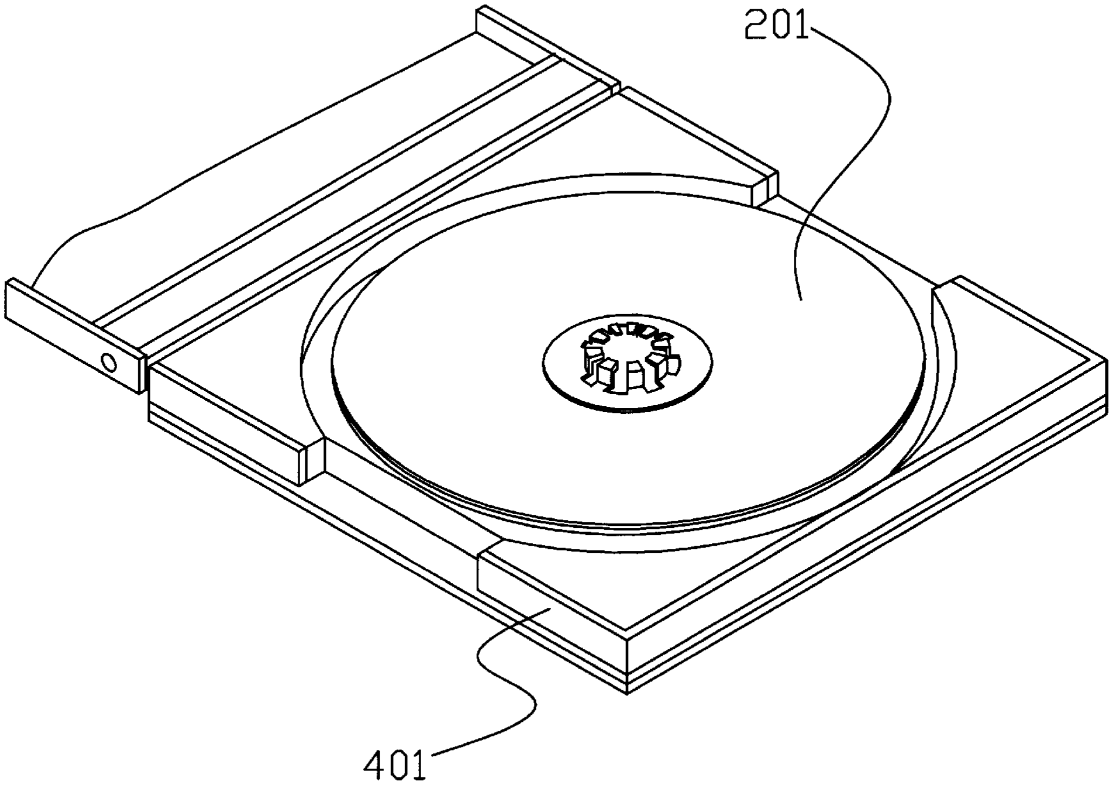
FIG. 9 is a perspective schematic view illustrating another step of adhering the label of the invention to the optical disk.

Referring to FIGS. 4 and 6, when it is desired to adhere the label to an optical disk 30, the central portions 102, 203 of the release paper 10 and the sticker layer 20 have to be removed first, so that a through hole d is formed at the center of the label. Since the outer diameters of the central portions 102, 203 are the same as that of the central hole 301 of the optical disk 30, the diameter of the central through hole d of the label and the central hole 301 of the optical disk 30 are also the same. In general, the optical disk 30 is generally placed inside a casing 40, which is provided with securing posts at the center to position the optical disk 30 therein. The labeling portion 201 of the sticker layer 20 is caused to be detached from the release 10 partly, and that part of the release paper 10 is folded back. Then the label with the through hole d is placed on the optical disk 30 in the casing 40 such that the through hole d aligns with the securing posts 401. Referring to FIG. 7, the labeling portion 201 are flattened out on the surface of the optical disk 30 so that the labeling portion 201 is completely even with the surface of the optical disk, while squeezing out any air between the optical disk 30 and the labeling portion 201. Then the release paper 10 is slowly pulled away from the sticker layer 20, with a hand on the labeling portion 201 to keep it stuck to the optical disk 30. At this point, the user can determine whether or not to tear off the annular portion 202 on the labeling portion 201 depending on the design of the patterns or words, as shown in FIGS. 8 and 9. In this way, the user does not need any tools to make the labeling portion 201 completely flat and even on the optical disk 30.

In summary, the present invention provides a breakthrough in the utilization and adhering labels to optical disks and enhances the convenience, safety, and economy of adhering labels to optical disks.

Furthermore, the sticker layer 20 may be made of a transparent plastic film, so that the sticker layer 30 can be removed from the release paper 10 to adhere to the optical disk 30 to provide a protective film for the surface of the optical disk 30 thereby protecting the optical disk 30 from being scratched.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A label adapted for use on optical disks, comprising a release paper and a sticker layer of a corresponding size, wherein said sticker layer is provided with a labeling portion of an outer diameter identical to or smaller than that of an optical disk and in the form of concentric circles, said labeling portion being provided with an annular portion and a central portion in the form of concentric circles, said annular portion being of the same size as that of a clamped portion of the optical disk, and said central portion having a size the same as the inner diameter of a central hole of the optical disk, said labeling portion further having a tearable outer periphery, and said annular portions of said sticker layer and said release paper and the circumferential periphery of said central portion being tearable but with a plurality of connecting points, lateral edges of said release paper and said sticker layer being both provided with tear-off lines which are parallel to the lateral edges so that said release paper forms an edge strip portion and said sticker layer forms an adhesive portion, said edge strip portion being tearable to expose said adhesive portion to allow sticking of said label to a sheet of paper for printing purposes, said adhesive portion being tearable from the sheet of paper after printing to remove said label, said annular portion and said central portion being directly cut off from said release paper and said sticker, said sticker layer being made of a transparent film, so that the sticker layer can be removed from the release paper to adhere to the optical disk to provide a protective film for the surface of the optical disk thereby protecting the optical disk from being scratched.

* * * * *